United States Patent [19]
Brouckman et al.

[11] Patent Number: 6,134,307
[45] Date of Patent: Oct. 17, 2000

[54] CALL CONVERSION PROCESS FOR A BUSINESS SYSTEM FOR A GLOBAL TELECOMMUNICATIONS NETWORK

[75] Inventors: Randall W. Brouckman, Oakton; Cheryl Marie Curran, Falls Church, both of Va.; Shawn Paul Hakl, Calgary, Canada; John Gardner Cleary, Herndon, Va.

[73] Assignee: Iridium IP LLC, Restin, Va.

[21] Appl. No.: 09/157,656

[22] Filed: Sep. 21, 1998

[51] Int. Cl.[7] .................................................. H04M 15/00
[52] U.S. Cl. ........................... 379/115; 455/432; 455/433
[58] Field of Search .............................. 379/13, 115, 116, 379/119, 120, 220, 222, 229, 230, 121; 455/405, 406, 455, 456, 450, 432, 433, 436, 408

[56] References Cited

U.S. PATENT DOCUMENTS

| | | | |
|---|---|---|---|
| 5,440,621 | 8/1995 | Castro | 379/114 |
| 5,768,353 | 6/1998 | Browne | 379/114 |
| 5,771,282 | 6/1998 | Friedes | 379/114 |
| 5,793,853 | 8/1998 | Sbisa | 379/114 |
| 5,873,030 | 6/1998 | Mechling et al. | 379/114 |
| 5,907,800 | 5/1999 | Johnson et al. | 379/114 |
| 5,970,403 | 10/1999 | Alperovich et al. | 379/111 |
| 5,978,462 | 11/1999 | Fuhrmann et al. | 379/201 |
| 6,005,926 | 12/1999 | Mashinsky | 379/115 |

*Primary Examiner*—Curtis A. Kuntz
*Assistant Examiner*—Rexford N Barnie
*Attorney, Agent, or Firm*—Sawyer Law Group LLP

[57] ABSTRACT

The present invention provides a method for converting call events. The method includes receiving a plurality of call events from a plurality of sources in a global telecommunications network; converting the plurality of call events a plurality of call event records, the call event records having different destinations; sending a first portion of the plurality of call event records to a first destination; and sending a second portion of the plurality of call event records to a second destination. The method of the present invention allows for different types of billing information to be sent to different entities around the world in a global telecommunications network. It ensures that the correct information is eventually routed to the correct entity, so that proper billing can be performed.

8 Claims, 9 Drawing Sheets

CALL CONVERSION PROCESS FOR A BUSINESS SYSTEM FOR A GLOBAL TELECOMMUNICATIONS NETWORK

FIELD OF THE INVENTION

The present invention relates to telecommunications networks, and in particular to the conversion of billing records for a business system for a telecommunications network.

BACKGROUND OF THE INVENTION

With the development of a global economy, business people who regularly travel internationally are a fast growing breed. To meet their needs, satellite-based global telecommunications networks are being developed. The first such network is to be commercially activated by Iridium LLC on Nov. 1, 1998. These networks provide international cellular phone and paging services. Such networks inevitably involve numerous entities in many different countries which work together as part of the network. Such entities involve governments, service providers, industry clearinghouses, and others. Each call made through the network often involve numerous entities and often cross national sovereignty lines. Each entity involved in a call receives a portion of the charge to the user of the network, and there are numerous sources of call event records for the same call or page. To properly bill customers for use of the network and to properly allocate revenues from these bills, information concerning which entities were involved in the call or page and to what extent they were involved (time of day, length of call, etc.) is required. Once the billing information is gathered and processed, the information must be converted so that they are prepared for storage and distribution. This is important because different types of information are to be sent to different entities in the network. If the wrong information is routed to the wrong entity, then proper billing cannot be performed.

Conventional methods of converting records for storage and distribution are inadequate as they do not involve a global network comprising of many different entities from around the world.

Accordingly, there exists a need for a call conversion process for a business system which converts call events for proper storage and distribution to entities around the world for a global telecommunications network. The present invention addresses such a need.

SUMMARY OF THE INVENTION

The present invention provides a method for converting call events. The method includes receiving a plurality of call events from a plurality of sources in a global telecommunications network; converting the plurality of call events a plurality of call event records, the call event records having different destinations; sending a first portion of the plurality of call event records to a first destination; and sending a second portion of the plurality of call event records to a second destination. The method of the present invention allows for different types of billing information to be sent to different entities around the world in a global telecommunications network. It ensures that the correct information is eventually routed to the correct entity, so that proper billing can be performed.

DETAILED DESCRIPTION

The present invention provides a method for a call conversion process for a business system which converts call events for proper storage and distribution to entities around the world for a global telecommunications network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 9 in conjunction with the discussion below.

To understand the rating process in accordance with the present invention, first the preferred embodiment of the telecommunications network which may use the present invention needs to be described.

Figure 1:
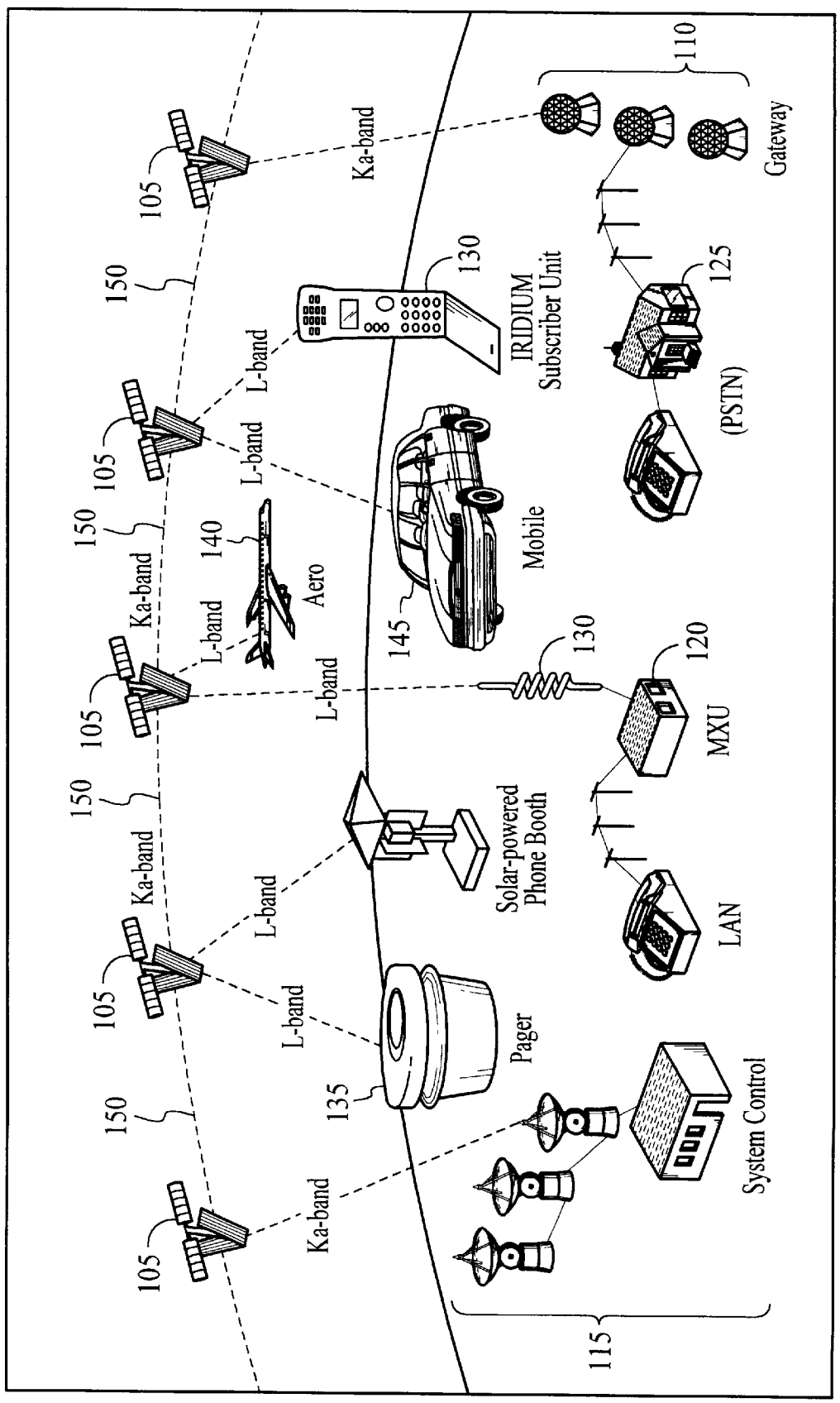
FIG. 1 illustrates a global telecommunications network which may use the present invention.

FIG. 1 illustrates a telecommunications network which may be used with the present invention. The network 100 includes low earth orbiting satellites 105, gateways 110, system control 115, and Mobile Exchange Units 120 (MXU). System Control 115 serves as the central management component for the network 100. Gateways 110 interconnect the satellite constellation 105 with public switched telephone networks 125 (PSTN), making communication possible between network cellular phones 130 and any other telephone in the world. The Mxu 120 provide access to the network 100 at remote locations. Telecommunications services may also be provided to pagers 135, aircraft 140, and automobiles 145.

Figure 2:
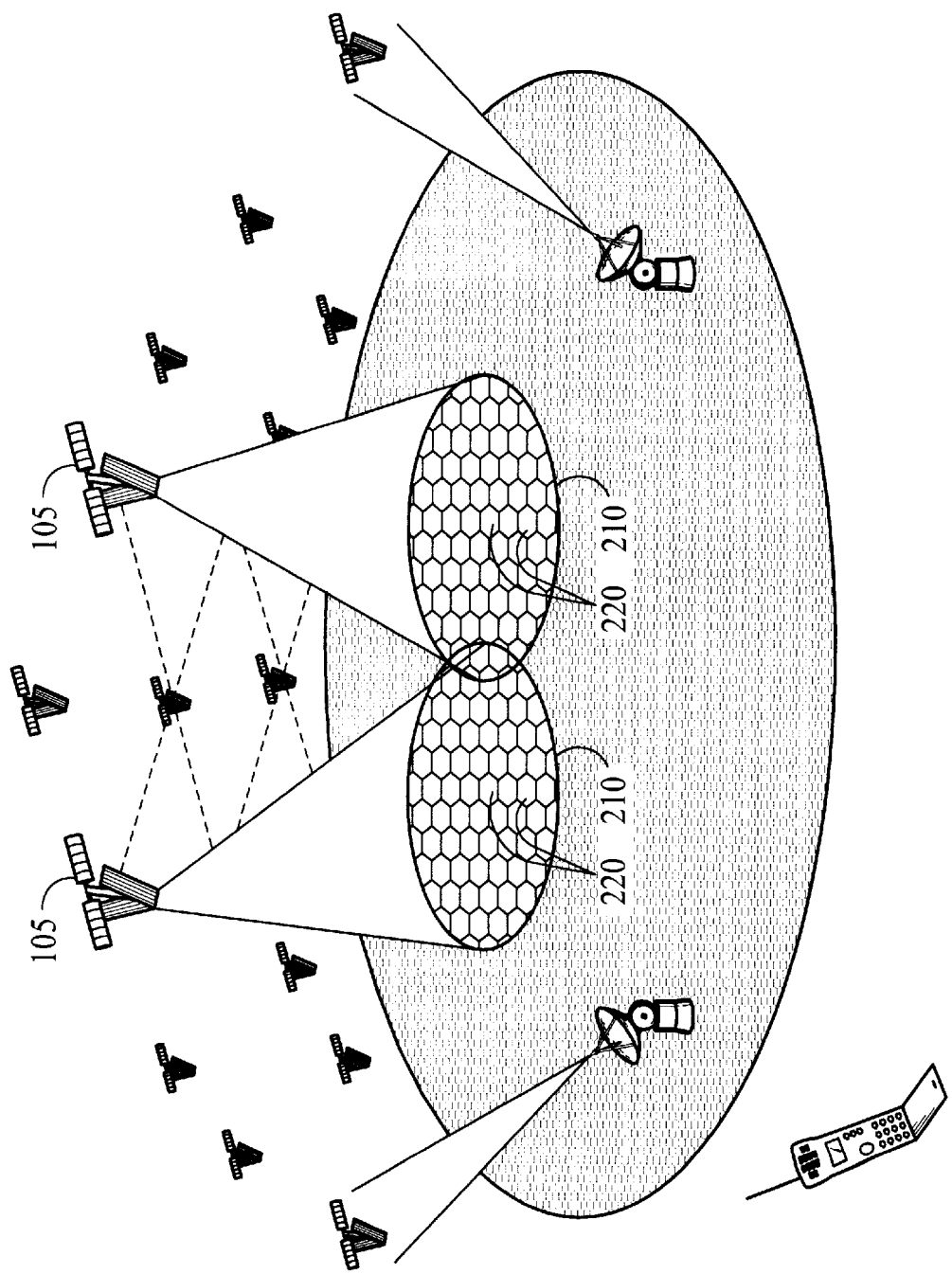
FIG. 2 illustrates satellite footprints of the global telecommunications network of FIG. 1.

The satellites 105 of the network 100 employ intersatellite links 150, or "crosslinks", to communicate directly with each other. These crosslinks 150 provide reliable, high-speed communications between neighboring satellites, allowing call routing and administration to occur efficiently. As illustrated in FIG. 2, each satellite 105 in the constellation has a ground coverage area called a "footprint" 210. The footprint 210 is further divided into smaller areas called "cells" 220. The footprints 210 of the satellites are overlapped to provide maximum coverage.

For a preferred embodiment of the call processing architecture of the network 100, the globe is divided into Location Area Codes (LACs). Each LAC is a service location for the network 100. Each gateway 110 services a certain set of LACs. For example, when a user makes a call from his/her cellular phone 130 to a particular location, the cellular phone 130 first links with a satellite 150 which has a cell servicing his/her current LAC. The cellular phone 130 requests a satellite channel for the call. The request is sent to the gateway 110 which services the caller's LAC. This gateway 110 then initiates the opening of a channel between phone 130 and the satellite 110. Once the channel is established, the signal for the phone call is routed through the crosslinks 150 of the satellites 105 to the gateway 110 servicing the LAC of the callers destination. This gateway 110 then sends the call to the PSTN 125 which routes the signal to the particular phone called.

Figure 3:
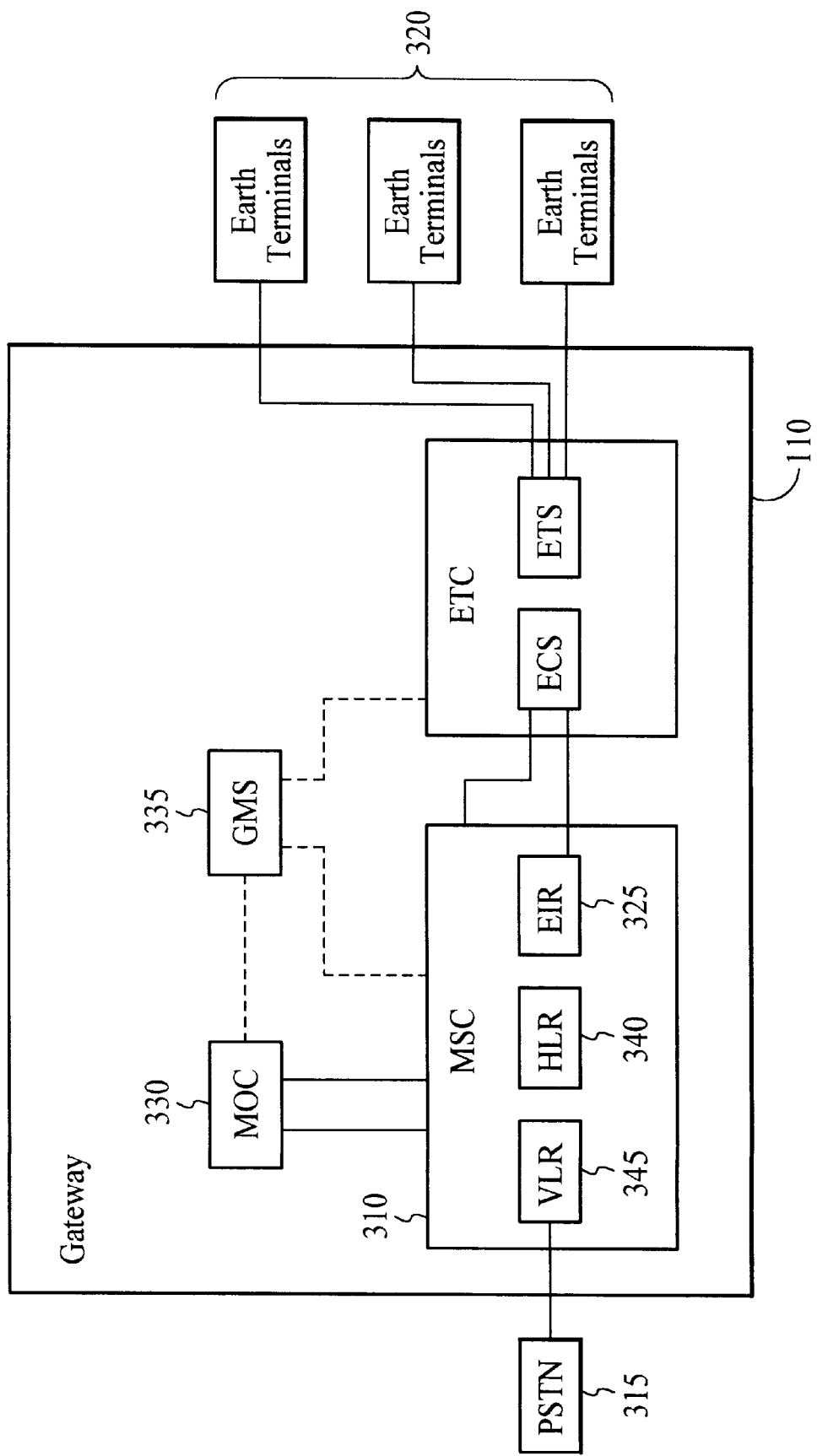
FIG. 3 illustrates a gateway of the global telecommunications network of FIG. 1.

FIG. 3 illustrates in more detail a preferred embodiment of the gateway 110 of the network 100. The heart of the gateway 110 is the Mobile Switching Center 310 (MSC) or the "switch". An example of a switch 310 which may be used is the Siemens GSM-D900 switch. The switch 310 has two "sides": a land side which connects to the local telephone network via the PSTN 315, and a mobile side which connects to Earth Terminal Controllers 320 which communicate with the satellite constellation 105 using K-band radio links. Information for the physical subscriber equipment (cellular phone 130, pager 135, etc.) is kept in the Equipment Identification Register 325(EIR). The gateway's 110 Message Origination Controller 330 (MOC) supports a variety of messaging services such as direct messaging to pagers. The Gateway Management System 335 (GMS) provides operations, administration, and maintenance support for each of the gateway subsystems.

In addition to the EIR 325, the switch 330 includes a Home Location Register 340 (HLR) and a Visited Location Register 345 (VLR). The HLR 340 stores subscriber service information for the "Home Gateway". A Home Gateway is assigned to each subscriber to the network 100 and is related to the LAC at which the subscriber is based. The Home Gateway is responsible for granting system access. Whenever a subscriber places or receives a call, the network 100 will determine the subscriber's location with accuracy sufficient for call control. The Home Gateway will receive and evaluate this location information to determine whether it is permissible for the call to proceed. This feature is essential to help ensure compliance with calling restriction laws in nations where such laws exist.

The Home Gateway is also responsible for the assignment of a Visited Gateway as part of the system access process. Subscriber location information is used to index into a map of the world kept at the Home Gateway. This determines a LAC for the visited location which in turn will be used to identify a Visited Gateway which will serve and control the mobile subscriber end of a call.

The Visited Gateway temporarily retains a copy of select subscriber information in its VLR 345. This information remains within the Visited Gateway until the subscriber "roams" into a new Visited Gateway territory or until it expires. When a subscriber is at "Home", the Visited Gateway and the Home Gateway are one and the same.

Figure 4:
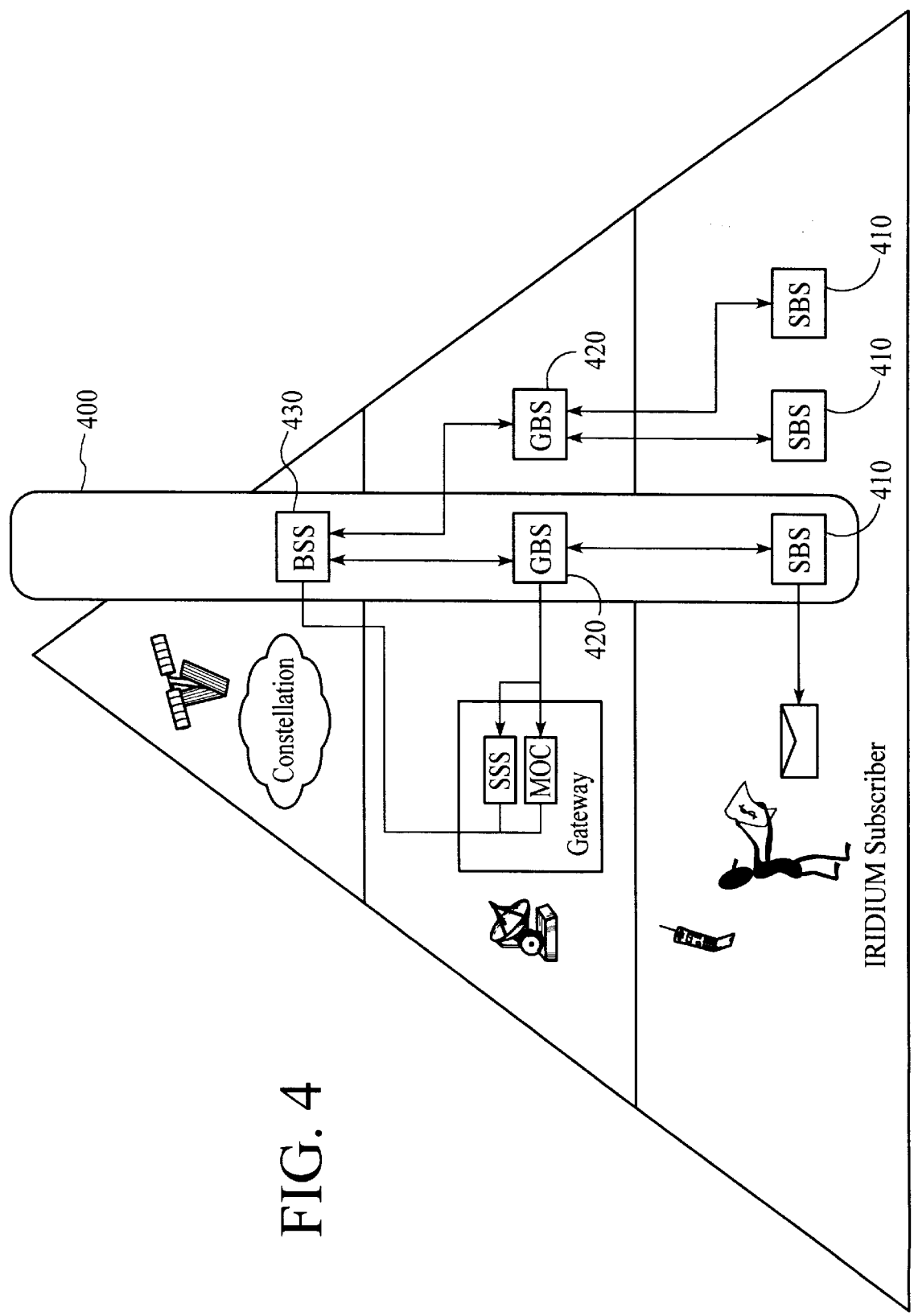
FIG. 4 illustrates a business system for managing the telecommunications network of FIG. 1.

To manage usage information of the network 100, a business system 400 is used. FIG. 4 illustrates a preferred embodiment of a business system 400 which may be used with the present invention. The business system 400 comprises three subsystems: the Service Provider System 410 (SBS), the Gateway Business System 420 (GBS), and the Business Support System 430 (BSS).

The SBS 410 includes service providers who sell subscriptions for usage of the telecommunications network 100 directly to the consumer and roaming partners who resells usage of the network 100 and also provide other cellular services in their own systems. SBS 410 functions include pre-sales support, service negotiation, general and billing inquiries, payment remittance, pricing and invoicing, receivables management, and account profile maintenance. The functioning of the SBS 410 will be described in more detail later.

The GBS 420 includes gateways 110 (FIG. 1) of the telecommunications network 100 and their operators. The functions of the GBS 420 includes service activation, Tier II customer support, payment and settlement processing, service provider management, usage collection, and retail rating. These functions are performed in the gateways 110. The functioning of the GBS 420 will be described in more detail later.

The functions of the BSS 430 includes gateway relationship management, financial and treasury management, and usage collection. They also include usage verification, revenue distribution, settlement statement generation, and payable/receivable processing. These functions are managed by a Clearinghouse.

Figure 5:
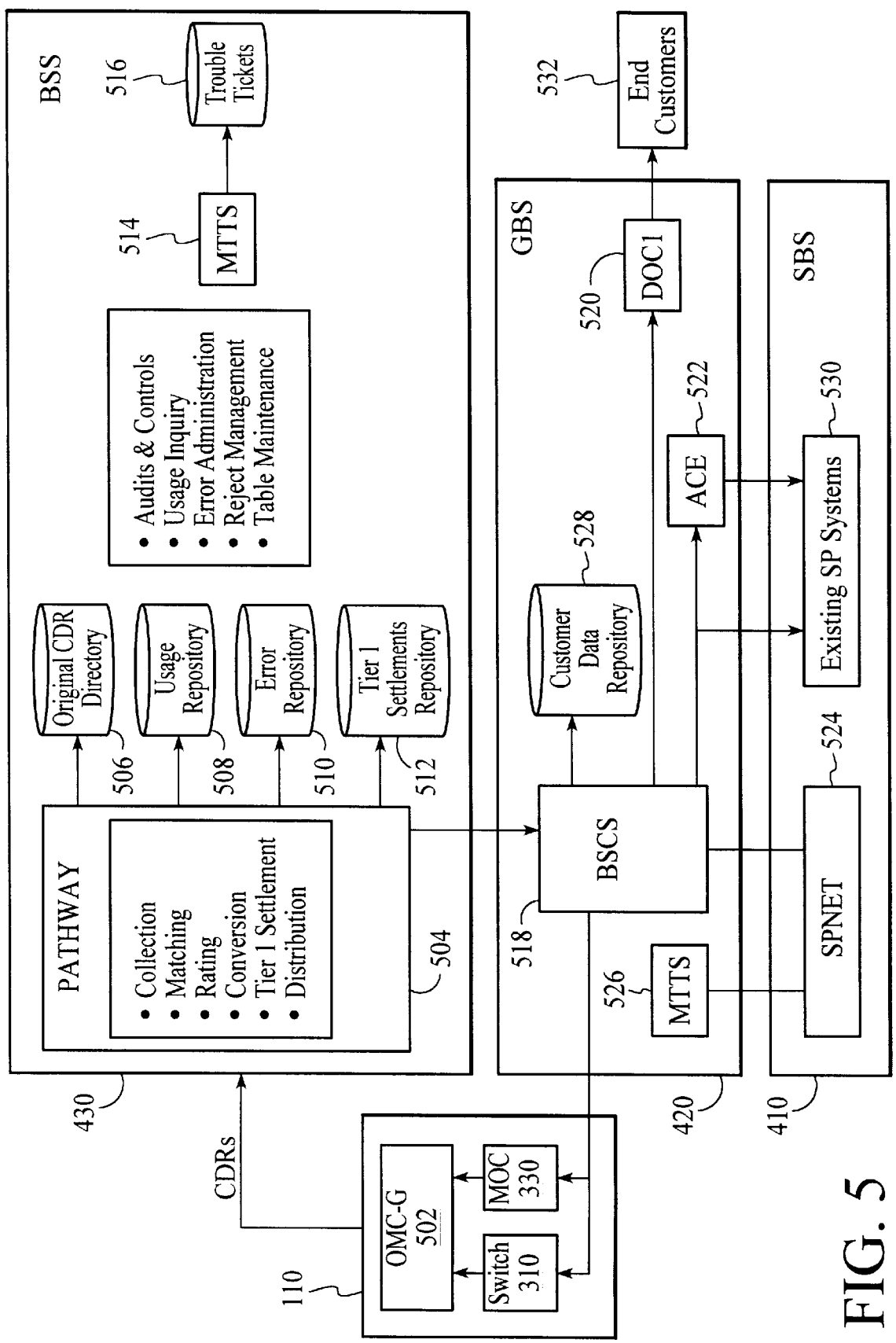
FIG. 5 illustrates in more detail the business system of FIG. 4.
Figure 6:
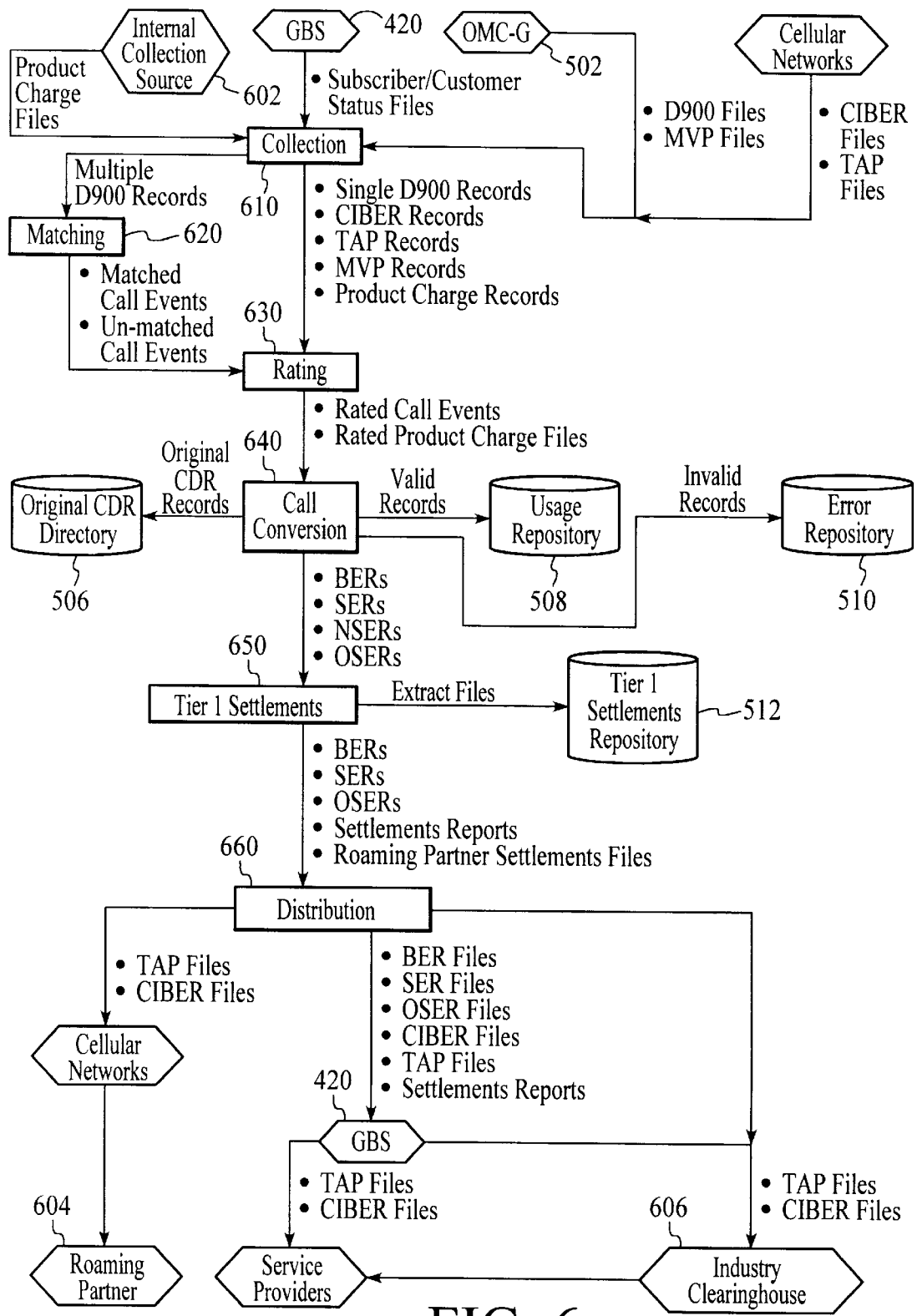
FIG. 6 is a flow chart which illustrates the pathway processes of the business system of FIG. 4.

To more particularly describe the processes of the BSS 430, please refer to FIGS. 5 and 6 in conjunction with the discussion below. FIG. 5 illustrates in more detail the processes of the business subsystems of the preferred embodiment of the business system 400 in the usage management of the telecommunications network 100, including the BSS 430. FIG. 6 is a flow chart illustrating the pathway processes 504 of the BSS 430.

The BSS 430 processes begin with the Collection Process, via step 610. Each time a call is made through the network 100, a record of the call event, called a Call Detail Record (CDR) is created in the gateway 110 in the network element and extracted by the Operations Maintenance Controller-Gateway 502 (OMC-G). These records could be in any number of formats, such as Siemens D900 (D900), and Glenayre Modular Voice Processing (MVP). The D900 files contain voice records; the MVP files contain messaging records. The OMC-G 502 notifies the BSS 430 when files containing CDRs in the D900 format are ready for collection. These files are then collected from the OMC-G 502 by the BSS 430. Files containing CDRs in the Cellular Intercarrier Billing Exchange Roamer (CIBER) and Transfer Account Protocol (TAP) formats are received by the GBS 430 via cellular network clearinghouses. The Collection Process also collects Subscriber and Customer Status files from the GBS 420. These records contain subscriber and cellular customer information, such as activation, deactivation, and service changes. Lastly, the Collection Process collects Product Charge files from an internal source 602. These files contain monthly and one-time charge records. The Collection Process then performs a series of validations on the collected files to ensure that the files are complete and properly formatted with industry-standard information, that subsequent BSS processes receive usable information, and that the BSS system integrity is maintained. Once the files have passed validations, the Collection Process converts the CDRs in the D900, MVP, CIBER, TAP, and product charge files into a standard format, called the Data Message Handling (DMH) format required for subsequent BSS processing. Conversion of files into the DMH format allows billing to be done more easily.

Sometimes, multiple CDRs are generated for a single call, called multiple records calls. From the Collection Process, the CDRs in D900 files that are not part of a multiple record call are sent directly to the Rating Process. Those that are part of a multiple record call are first sent to the Matching Process, via step 620, where they are matched with other CDRs in the call. These CDRs are then combined into a single call event and then sent to the Rating Process.

The Rating Process, via step 630, first performs record-level validations. The validation ensures that the files are complete and properly formatted. This pre-processing step ensures that the CDRs, and the information they contain, are valid and comply with industry standards. It then translates this input into an industry standard format called Data Message Handling (DMH). The Rating Process then determines which DMH formatted call events are ratable and which call events are not ratable. A call event is "ratable" if it can be subjected to a rate model or pricing adjustment. For all that are ratable, the Rating Process applies the appropriate pricing model, pricing adjustments, and taxes to determine total charges. The total call revenue is allocated between all entities (service providers, gateway operators, roaming partners, government agencies, etc.) involved in the call event, as each entity receives a portion of the total call revenue. The outputs of the Rating Process are rated call events and rated product charge files which are sent to the Call Conversion Process.

The Call Conversion Process, via step 640, prepares rated call events sent from the Rating Process for storage and distribution. The Call Conversion Process converts the rated call events into formats readable by subsequent repositories, or storage areas for call events, and processes. The Call Conversion Process creates valid records for any rated call events that do not contain errors. Valid records are then loaded in the Usage Repository 508. Invalid records are created for any rated call events that contain errors and stored in the Error Repository 508. The original CDRs are assembled into files for loading into a directory 506 separate from the Usage Repository 508. The original CDRs are important because they serve as a complete record of the original data as it was received from the gateway 110. Rated call events that do not contain errors are converted to different types of event records, such as Billing Event Records (BER), Settlement Event Records (SER), Net Settlement Event Records (NSER), and Outcollect Settlement Event Records (OSER).

The purpose of a BER is to bill a subscriber for using the network 100. BERs are sent to the home gateway of a chargeable subscriber.

The purpose of a SER is to notify gateways 110 of their settlement roles in a call, but not to bill a subscriber. SERs are sent to all gateways 110 involved in the handling of the call, excluding the home gateway that received the BER.

NSERs contain a summary of all charge information associated with a particular call. NSERs are sent to the Tier 1 Settlements Repository 512.

OSERs contain call activity and charge information for calls in which the customer of a roaming partner is the chargeable party. OSERs are sent to the gateway 110 associated with the roaming partner whose customer made a call.

The Tier I Settlements Process, via step 650, receives NSERs from the Call Conversion process and translates them into data suitable for loading into the Tier 1 Settlements Repository 512. This data takes the form of extract files, which contain important financial and usage information necessary for reporting purposes. These files are held in temporary storage for later release to the Distribution Process. In addition to creating extract files, the Tier I Settlements Process also creates settlement reports and releases them to the GBS 420 and the Clearinghouse.

There are three types of settlement reports: financial reports, usage reports, and operational reports. Financial reports capture daily and month to date financial activity of entities involved in the calls. Usage reports capture the monthly system activity for each gateway 110. Operational reports capture information pertaining to BSS processing, such as collection and distribution, audit, error, reject management, rate package, and roaming agreement information. These reports are released to the Distribution Process where they will be grouped according to their destination point and distributed.

The Distribution Process, via step 660, receives BER files, SER files, OSER files, and settlements reports from the Tier I Settlements Process, and sends them to their final destinations: the GBS 420, roaming partners 604, and industry clearinghouses 606. The Distribution Process first groups and formats the files according to their type and destination. Once grouped, the BER, SER, and roaming partner settlement files, and settlement reports are ready for final distribution. However, OSER files require conversion into TAP and CIBER files before it is ready for distribution. The BER files are distributed to the home gateway of a subscriber. The SER files are distributed to a gateway 110 involved in the handling of a portion of a call, excluding the home gateway which received the BER. The original OSER files are distributed to a gateway 110 involved in handling a portion of a call in which a roaming, non-system customer is the chargeable party. The TAP and CIBER files converted from the original OSER files are then distributed to roaming partners and industry clearinghouses. Roaming partner settlement files are distributed to gateways or directly to a roaming partner or industry clearinghouse. These files contain charges payable to roaming partners or receivable from roaming partners, and is used by gateways 110 to perform Tier II settlements processing and reporting, as described later. Settlement reports are distributed to all gateways 110 and the Clearinghouse.

In addition to the processes described above, the preferred embodiment of the BSS 430 also includes five BSS applications which may be accessed by Clearinghouse personnel. These include Audits and Controls, Usage Inquiry, Error Administration, Reject Management, and Table Maintenance. Each of these applications has a Graphical User Interface (GUI) that provides Clearinghouse personnel the ability to track errors, view usage information, and update reference tables in the system. Information from these interfaces is provided to gateways 110 via operational reports.

The purpose of the Audits and Controls application is to track information as it flows through the processing steps described above. This application allows Clearinghouse personnel to monitor the status of files as they move through the BSS 430.

The Usage Inquiry GUI allows access to information contained in the Usage Repository 508. This Usage Inquiry application allows Clearinghouse personnel to view original D900, CIBER, TAP, and MVP records, charge information associated with a particular call, or product charge information.

The Error Administration application allows Clearinghouse personnel to track and troubleshoot records that have erred out of the processing path. The application searches for erred records that are located in the Error Repository 510 and displays this information in varying levels of detail. This application is also used to respond to trouble notification generated by an error threshold monitoring process. This error threshold monitoring process examines the contents of the Error Repository 510 and compare the error volumes and potential revenue loss to defined pre-determined thresholds. If a threshold is exceeded, a trouble ticket is opened in the Maintenance Ticket Tracking System 514 (MTTS) and stored in the Trouble Ticket Repository 516. Clearinghouse personnel can then access Error Administration to reduce the level of errors associated with the trouble ticket.

The Reject Management application accesses any records or files which do not pass validation. This application allows Clearinghouse personnel to view, reject, and recycle these records or files. It also allows for the tracking and verification of the accuracy of all records coming into the system from roaming partners and industry clearinghouses.

The Table Maintenance application allows Clearinghouse personnel to input and update reference information contained in tables use by the normal processes. It also provides an audit trail so that the history of each table update is recorded.

The BER, SER, and original OSER files and settlement reports resulting from the Distribution Process of the BSS 430 are collected by the GBS 420. These files are then processed by the Billing System and Control System 518 (BSCS). The BSCS 518 first converts the BER and SER files in the DMH format into the Unrated Transaction (UTX) format. With files in this format, the BSCS 518 performs wholesale and retail billing. This billing process rates the call events, taking into account the countries involved in the call, the tax laws of these countries, the currencies of these countries, and the languages of these countries. The result of the wholesale and retail billing performed by the BSCS 518 are files in the TAP format. The billings for direct system customers 532 (retail billing) are forwarded to the DOC1 process 520, which creates invoices which are then sent to the customers. For the billings for service providers 530 (wholesale billing), some service providers require billings in the TAP formats while others require them in the CIBER format. Those that require them in the TAP format receive the billings directly from the BSCS 518. Those that require them in the CIBER format have their billings first sent to the conversion engine (ACE) 522, which converts these billings into the CIBER format. They are then sent to the service providers of the SBS 410.

In addition to billing, the BSCS 518 also performs Tier II Settlement where the appropriate settlement reports are sent to the correct entities, be it service providers, roaming partners, or some other entity. With SPNet 524, service providers may use their existing systems and still provide the network services. This eliminates the need for service provides to have hardware and software specifically designed to work with the network 100.

When a service provider of the SBS 410 sells network services to a customer, the service provider may activate that customer's account through the Service Provider Net (SPNet) system 524. The SPNet 524 is a personal computer with software to access Web pages via direct connectivity to GBS or via the internet. Through Web access, the service provider can enter all the information required for the activation of the customer's account. Then, an intermediary software package at the GBS, called QA Partner, sends the information to the BSCS 518. The SPNet 524 may also be used to input problems experienced by the customer into the MTTS 526 on the GBS 420. The MTTS 526 functions similar to the MTTS 514 of the BSS 430.

The BSCS 518 stores a copy of this information in its Customer Data Repository 528. Once received, the BSCS 518 sends the information to the switch 310 of the gateway 110 which would be the customer's Home Gateway, and activates the network elements for service to this customer. The switch 310 sends back to the BSCS 518 a confirmation of receipt of the information. Once the BSCS 518 receives confirmation, it notifies the BSS 430 of the activation so that when it receives CDRs for this customer, it will recognize it as a valid record.

The Collection, Matching, Rating, Settlements, and Distribution Processes are disclosed, respectively, co-pending U.S. patent applications entitled, "A Billing Records Collection Process for a Business System for a Global Telecommunications Network," Ser. No. (1090P), filed on Sep. 21, 1998, "A Matching Process for a Business System for a Global Telecommunications Network," Ser. No. (1091P), filed on Sep. 21, 1998, "A Call Rating Process for a Business System for a Global Telecommunications Network," Ser. No. (1092P), filed on Sep 22, 1998; "A Settlements Process for a Business System for a Global Telecommunications Network," Ser. No. (1094), filed on Sep. 22, 1998; and "A Distribution Process for a Business System for a Global Telecommunications Network," Ser. No. (1095P), filed on Sep. 22, 1998. Applicant hereby incorporates these Patent Applications by reference.

To more particularly describe the Call Conversion Process in accordance with the present invention, refer to FIGS. 7 through 9 and the discussion below.

The Call Conversion process of the present invention prepares rated call events sent from the Rating Process for storage and distribution. It translates these call events into formats readable by all subsequent repositories and IBS processes. In doing so, the Call Conversion Process is a key component in the successful storage of network activity information and distribution of billing and settlement information.

Figure 7:
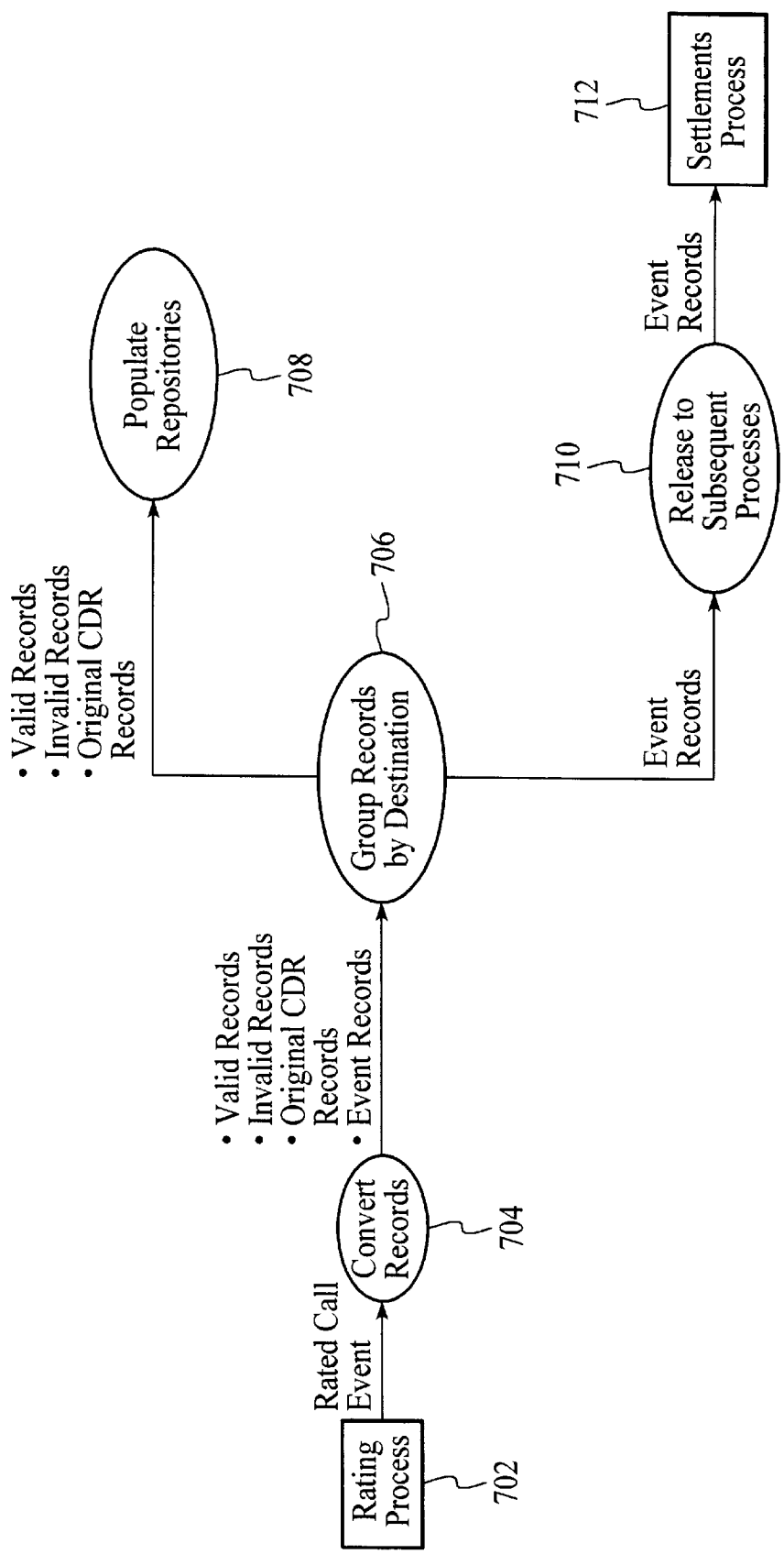
FIG. 7 is a flow chart which illustrates a preferred embodiment of the call conversion process in accordance with the present invention.

FIG. 7 is a flow chart illustrating a preferred embodiment of the Call Conversion Process in accordance with the present invention. The Call Conversion Process receives rated call events from the Rating Process, via step 702. The rated call events are converted to the appropriate records, via step 704. These appropriate records are grouped by destination, via step 706. Some of the appropriate records are loaded into their corresponding repositories, via step 708. Other appropriate records are released for subsequent BSS processing, via step 710.

CONVERT RECORDS

To for every rated called events receipts, Call Conversion creates a different set of records is different destinations, via step 704. In the preferred environment, records may be created as one of the following types: (1) valid records, records to do not contain errors and can be processed properly; (2) original CDR records, records containing original CDR data as it was received into the BSS 430 from the switch, and containing all of the information contained in the original CDR, whereas valid records only contain key fields from the original CDR; (3) invalid records, records containing errors that make it impossible for Call Conversion to conduct further processing; and (4) event records, records that contain call activity and charge information and are used for billing and settlement purposes.

The type of records created is determined by the call scenario of the rated call event received from the Rating Process. For example, for a subscriber unit to PSTN voice rated call event in which there are no errors, Call Conversion would produce the following records: valid 900 CDR record, because there are no errors in the rated call event received from the Rating Process; D900 original CDR record, always produced for every rated call event; charge information record, produced for any rated call event that does not contain errors; event records, always generated for any rated call event does not contain errors.

GROUP RECORDS BY DESTINATION

After the records are converted, they are ready to be stored in repositories or released to subsequent processing, via step 706. In order to facilitate efficient storage and processing, Call Conversion groups the converted records and files according to the final destinations. Valid records, for example, are grouped into files for loading into the Usage Repository 508 (FIG. 5), invalid records are grouped into files for loading into the Error Repository 510, and original CDR records are assembled into files for loading into a separate directory. Once properly groups, files to be loaded into repositories and released to subsequent processes.

POPULATE REPOSITORIES

Figure 8:
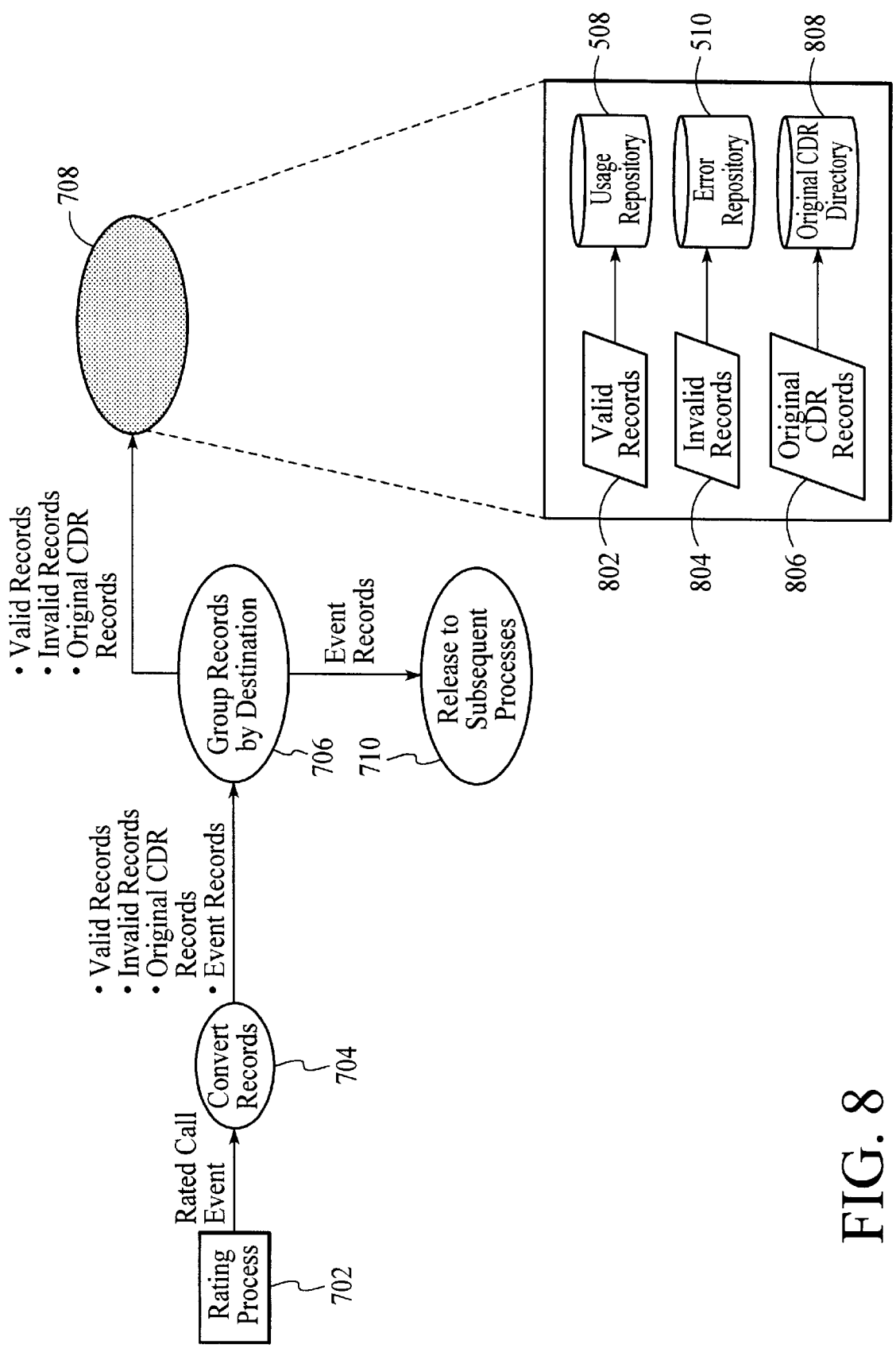
FIG. 8 illustrates in more detail the populating of repositories step in the call conversion process in accordance with the present invention.
Figure 9:
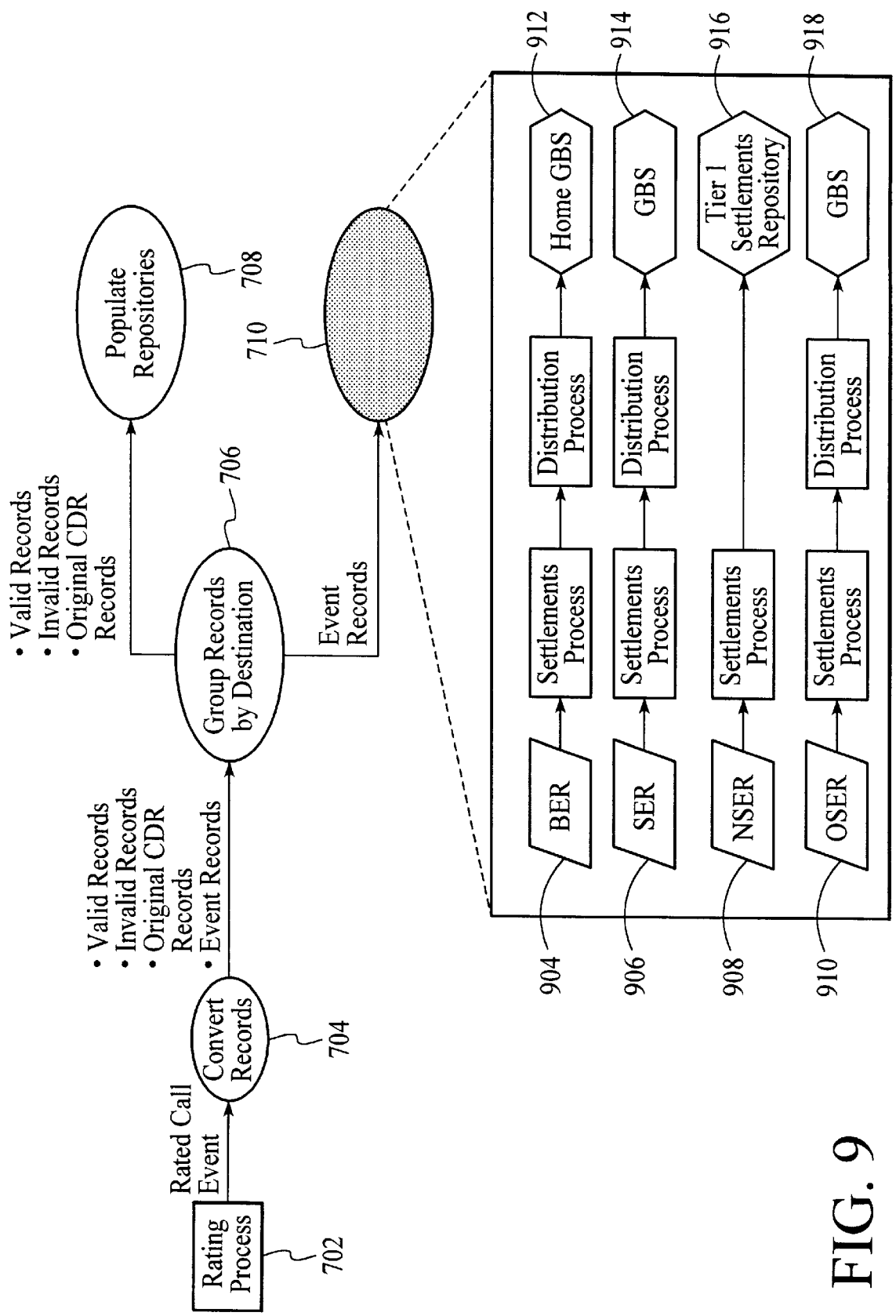
FIG. 9 illustrates in more detail the releasing to subsequent processes step in the call conversion process in accordance with the present invention.

FIG. 8 illustrates in more detail the population of repositories, step 708, of the Call Conversion Process of the present invention. Valid files 802 are loaded into the Usage Repository 508. Once stored, valid records provide information about call activity and charges for historical reference. These can be accessed through the Usage Inquiry application, as outlined above.

Invalid files 804 are loading into the Error Repository 510. Through the Error Administration application, invalid files contained in the Error Repository 510 can be viewed, managed, and recycled back through the BSS 430.

Original CDR files 806 are loaded into the directory separate from the Usage Repository 508. Original CDR files are important because they serve as the complete record of the original data as it was received from the switch 310. Original CDR data can be viewed for historical reference through the Usage Inquiry application.

If the Call Conversion process is unable to load files into their respective repositories, an alarm is generated to indicate operational errors.

RELEASE TO SUBSEQUENT PROCESSES

Unlike valid files, original CDR files, and invalid files, event records go on to subsequent BSS processing, via step 710. FIG. 9 illustrates in more detail the release of records to subsequent processes of the Call Conversion Process of the present invention. Each type of even record (BER 904, the SER 906, NSER 908, or OSER 910) has its own purpose in its own separate destination.

Purposes of each these files were described above. The final destination of the BER 904 is the home gateway 912 of the network subscriber. The final destination of the SER 906 is any non-home gateway 914 involved in handling a portion of a call. NSER 908 converted into different types of records during the Settlement Process and loaded into the Tier I Settlements Repository 916. OSER 910 distributed to the gateway 918 involved with the handling the call and settling with the roaming partner. Note that BER 904, SER 906, and OSER 910 pass through the Settlements Process and the Distribution Process before reaching their final respective destinations. NSER 908 pass through the Settlements Process before reaching its final destination.

For example, assume a network subscriber makes a subscriber unit to PSTN call where the home gateway is the Chinese gateway and the terminating and originating gateway is the North American gateway. The following event records would be generated: (1) BER, generated because a network subscriber is the chargeable party, and would be sent to the gateway in China; (2) SER, generated and sent to the North American gateway as notification of its role in the call as the originating and terminating gateway; (3) NSER, generated for any rated call event that does not contain errors and for which charges are generated, and provides input to settlement reports.

In addition to receiving rated call events from the Rating Process, the Call Conversion Process of the present invention also receives rated Product Charge files. Product Charge files contain charges associated with activation, de-activation, or changes in service for network subscribers and customers. The types of event records generated from rated Product Charge files depend on the subscriber or customer association.

In the preferred embodiment, for a rated Product Charge file associated with a network subscriber, the Call Conversion Process generates a SER and NSER. As with the rated call events, the SERs generated will be sent to the gateway 914 involved in the change or addition in service for settlements purposes, and the NSER will be sent to the Tier 1 Settlement Repository 916. For a rated Product Charge file associated with the customer of a roaming partner, the Call Conversion Process will generate an OSER and NSER. As with rated call events, OSERs will be sent to the gateway 918 involved in the change or addition in service for settlements purposes.

A method for call conversion for a business system which converts call events for proper storage and distribution to entities around the world for a global telecommunications network has been disclosed. The method of the present invention allows for different types of billing information to be sent to different entities around the world in a global telecommunications network. It ensures that the correct information is eventually routed to the correct entity, so that proper billing can be performed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for converting call events, comprising the steps of:
   (a) receiving a plurality of call events from a plurality of sources in a global telecommunications network;
   (b) converting the plurality of call events into a plurality of call event records, the call event records having different destinations wherein the types of call event records comprise valid records, original call detail records, invalid records, and event records, wherein the valid records, the invalid records, and the original call detail records are sent to the first destination, wherein the event records are sent to the second destination;
   (c) sending a first portion of the plurality of call event records to a first destination; and
   (d) sending a second portion of the plurality of call event records to a second destination, wherein a plurality of final destinations for the event records comprise:

sending a first portion of the event records to a home gateway, sending a second portion of the event records to a plurality of gateways involved in handling a portion of a call, sending a third portion of the event records to a settlements repository, and sending a fourth portion of the event records to a plurality of gateways involved with handling of a call and settling with a roaming partner.

2. The method of claim 1, wherein the first destination is a plurality of repositories comprising a usage repository, an error repository, and an original call detail record directory.

3. The method of claim 1, wherein the second destination is a plurality of subsequent processes, the subsequent processes comprising a settlements process and a distribution process.

4. The method of claim 1, wherein valid records are sent to a usage repository, invalid records are sent to an error repository, and original call detail records are sent to an original call detail record directory.

5. A method for converting call events, comprising the steps of:

(a) receiving a plurality of call events from a plurality of sources in a global telecommunications network;

(b) converting the plurality of call events into a plurality of call event records, the call event records having different destinations wherein the types of call event records comprise valid records, original call detail records, invalid records, and event records, wherein the valid records, the invalid records, and the original call detail records are sent to the plurality of repositories, wherein the event records are sent to the plurality of subsequent processes;

(c) sending a first portion of the plurality of call event records to a plurality of repositories;

(d) sending a second portion of the plurality of call event records to a plurality of subsequent processes, wherein a plurality of final destinations for the event records comprise:

sending a first portion of the event records to a home gateway, sending a second portion of the event records to a plurality of gateways involved in handling a portion of a call, sending a third portion of the event records to a settlements repository, and sending a fourth portion of the event records to a plurality of gateways involved with handling of a call and settling with a roaming partner.

6. The method of claim 5, wherein valid records are sent to a usage repository, invalid records are sent to an error repository, and original call detail records are sent to an original call detail record directory.

7. A method for converting call events, comprising the steps of:

(a) receiving a plurality of call events from a plurality of sources in a global telecommunications network;

(b) converting the plurality of call events into a plurality of call event records, the call event records having different destinations, wherein the types of call event records comprise valid records, original call detail records, invalid records, and event records;

(c) grouping the plurality of call event records according to their final destinations;

(d) populating a plurality of repositories with valid records, the invalid records, and the original call detail records, wherein valid records are sent to a usage repository, invalid records are sent to an error repository, and original call detail records are sent to an original call detail record directory; and (e) releasing to a plurality of subsequent processes a second portion of the plurality of call event records, wherein a plurality of final destinations for the event records comprise sending a first portion of the event records to a home gateway, sending a second portion of the event records to a plurality of gateways involved in handling a portion of a call, sending a third portion of the event records to a settlements repository, and sending a fourth portion of the event records to a plurality of gateways involved with handling of a call and settling with a roaming partner.

8. A computer readable medium with computer instructions for converting call events, comprising instructions for:

(a) receiving a plurality of call events from a plurality of sources in a global telecommunications network;

(b) converting the plurality of call events into a plurality of call event records, the call event records having different destinations wherein the types of call event records comprise valid records, original call detail records, invalid records, and event records, wherein the valid records, the invalid records, and the original call detail records are sent to the first destination, wherein the vent records are sent to the second destination;

(c) sending a first portion of the plurality of call event records to a first destination; and (d) sending a second portion of the plurality of call event records to a second destination, wherein a plurality of final destinations for the event records comprise:

sending a first portion of the event records to a home gateway, sending a second portion of the event records to a plurality of gateways involved in handling a portion of a call, sending a third portion of the event records to a settlements repository, and sending a fourth portion of the event records to a plurality of gateways involved with handling of a call and settling with a roaming partner.

* * * * *